Figure 1:
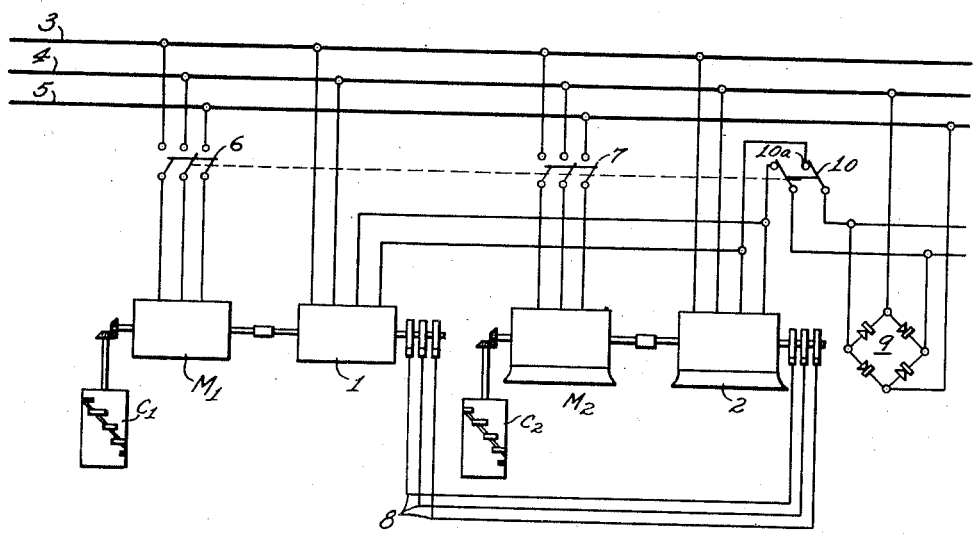

Nov. 10, 1942.    H. HARZ ET AL    2,301,698
SYNCHRO-TIE UNIT
Filed Nov. 27, 1940

WITNESSES:
James F. Young
Wm. J. Ruano

INVENTORS
Hermann Harz and
Volkmar Türck.
BY
Paul E. Friedemann
ATTORNEY

Patented Nov. 10, 1942

2,301,698

UNITED STATES PATENT OFFICE 2,301,698

SYNCHRO-TIE UNIT

Hermann Harz and Volkmar Türck, Berlin-Siemensstadt, Germany, assignors to Westinghouse Electric & Manufacturing Company, East Pittsburgh, Pa., a corporation of Pennsylvania Application November 27, 1940, Serial No. 367,363
In Germany August 12, 1939

5 Claims. (Cl. 172—293)

Our invention relates to a system provided for the purpose of causing the rotating members of two or more electric motors to assume positions with respect to one another which, at any instant, will exactly coincide with certain definite, predetermined relative positions prescribed for said members. Such electric motors may be used, for instance, as pilot-motors for readjusting the positions of switching or control devices, or they may be provided as driving motors for sectional drives (paper machines, rolling mills, and the like). Each motor is coupled with a synchron-tie machine, and all the synchro-tie machines are electrically coupled together in order to coordinate the motions of the motors insofar as their rotational speeds and their angular positions in space are concerned. It is a well known practice to use polyphase induction motors as synchro-tie machines, the rotor circuits of these motors being electrically coupled together for the purpose of establishing a so-called "electrical line-shaft." With this arrangement, equalizing currents will flow in the conductors, by means of which said rotor circuits are connected together, as soon as the rotors start to deviate from the relative angular positions in space which they should occupy, and these equalizing currents will cause the immediate return of the rotors to their correct instantaneous positions.

When an arrangement of the kind just referred to has to be used in an installation where the apparatus to be electrically coupled together, for example, must be brought to a stop exactly in certain definite, predetermined positions, difficulties will be encountered when the moments of inertia of the moving parts, including those of the pilot motors actuating said switching or control devices, are relatively high, for in this case the moving parts will overtravel the positions in which they are supposed to come to a stop when the pilot-motors are disconnected from the power source, or the moving parts will start to oscillate, sometimes to such an extent that the synchro-tie machines will be caused to impart starting impulses to one another. It has been attempted to avoid these difficulties by the use of mechanical brakes in conjunction with the three-phase synchro-tie machines of the synchro-tie outfit. But in several instances such brakes have been found to be unreliable, due to the fact that the braking effect changes as a consequence of dirt-accumulations and wear. In other words, the pilot motors either would not reach the angular positions in which they were supposed to come to a stop, or they would start to oscillate around said angular positions, often so violently that the machines would pull away altogether from these positions, in spite of the presence of the brakes.

An object of our present invention is to avoid the disadvantages just referred to by equipping the synchro-tie machines that are coupled with the pilot-motors with electromagnetic brakes, which brakes may either be caused to function uninterruptedly, or they may remain disconnected from their energizing source up to the instant at which the pilot-motors are disconnected from the power source. In the case just mentioned, the losses will not be greater than those to be reckoned with when mechanical brakes are used. In the second case, the brake-losses will be zero as long as the pilot-motors are readjusting the operating positions of the switching or control devices in question. The braking effect will be the same in either case.

Any one of the known eddy-current brakes, energized either by direct current or by alternating current, may be used for the purpose outlined in the preceding paragraph; when such a brake is not required to be operative it may be disconnected from its energizing source at any instant. This should preferably be done by coupling a switch provided for this purpose in the energizing circuit of the brake with the line circuit breaker of the pilot-motor.

A very simple arrangement can be obtained when the synchro-tie machines are provided in the form of three-phase induction motors. It is obtained by connecting two of the winding-phases of the stator of each synchro-tie machine to the power-supply line, and by energizing the third winding-phase of the stator by direct current. With this arrangement, the alternating current phases will have on the rotor only an induction-effect that will cause the synchro-tie machine to function in the customary manner; the direct current phase, however, will exert a braking effect on the rotor and will thus suppress harmful oscillating motions and prevent an unintentional starting up of the synchro-tie machine, in other words, the pilot-motors will be brought to a stop by highly effective means.

Figure 2:
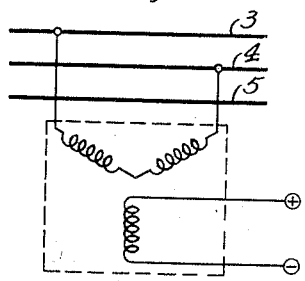

Other objects and advantages will become more apparent from a study of the following specification when considered in conjunction with the accompanying drawing, in which Figure 1 is a schematic showing of a control system embodying the principles of our invention; and Fig. 2 is a schematic showing of the stator winding connections of a synchro-tie motor as used in Fig. 1.

Referring to Figs. 1 and 2 of the drawing, two pilot-motors $M_1$—$M_2$, provided in the form of commutator motors, actuate the movable members of two drum-type controllers $C_1$—$C_2$. Each pilot-motor is coupled with a synchro-tie machine 1 and 2, respectively. The two pilot-motors are connected to a three-phase power-supply line 3—4—5 through ordinary contactors 6 and 7 (which are interconnected as indicated by dotted lines), or through reversing contactors, which are controlled simultaneously (not shown). The rotor windings of the synchro-tie machines are connected together by means of wires 8 constituting the so-called "electrical line-shaft." The stator windings are connected, as shown in Fig. 2, to the two phase-wires 3 and 4 of the power-supply line, the third winding-phase of each stator being connected to a direct current source (indicated by + and —), provided in the system shown on Fig. 1 in the form of a rectifier 9 (preferably of the copper-copper oxide type) whose input-terminals are connected to the phase-wires 4 and 5 of the power-supply line.

The braking effort is not required until after the pilot-motors have covered the major portions of the desired control displacements. It is merely necessary, therefore, to install, in the direct current circuit provided for energizing the winding-phases that must produce the braking effects, a switch 10, and to close this switch at the instant at which the pilot-motors are disconnected from the power-supply line, or preferably somewhat earlier, by advancing somewhat the contact-motion of the switch, so that the switch will close before the contactors 6 and 7 disconnect the pilot-motors from the power-supply line. In this manner motor $M_1$ may definitely control the movement of machine 2 and controller $C_2$. If desired, also, motor $M_2$ may be used to control the rotational movement of machine 1 and controller $C_1$. In the latter instance, if desired, contactor 6 may be connected with a contactor similar to contactor 10 so as to close the direct current circuit at the moment or slightly before or after the moment contactor 6 is opened. Of course switches 6, 7 and 10 could be individually operated if desired.

We are, of course, aware that others, particularly after having had the benefit of the teachings of our invention, may devise other devices and systems of control embodying our invention, and we, therefore, do not wish to be limited to the specific showings made in the drawing and the descriptive disclosure hereinbefore made, but wish to be limited only by the scope of the appended claims and such prior art that may be pertinent.

We claim as our invention:

1. A synchro-tie control system comprising, in combination, a pair of pilot motors, a pair of synchronous machines having polyphase stator and rotor windings and each having its rotor mechanically coupled to one of the pilot motor rotors, a polyphase source of alternating electric energy for supplying a portion of said stator windings, a source of direct current energy for supplying the remaining portion of said stator windings, switching means for completing a circuit from said direct current source of energy to said remaining stator winding portion, the rotor windings of said synchronous machines being electrically interconnected to form a synchro-tie between said machines.

2. A synchro-tie control system comprising, in combination, a pair of pilot motors, a pair of synchronous machines having polyphase stator and rotor windings and each having its rotor mechanically coupled to one of the pilot motor rotors, a polyphase source of alternating electric energy for supplying a plurality of each of said stator windings, a source of direct current energy for supplying one of each of said stator windings, switching means for completing a circuit from said direct current source of energy to each of said respective stator windings, the rotor windings of said synchronous machines being electrically interconnected to form a synchro-tie between said machines.

3. A synchro-tie unit comprising a pair of alternating current synchronous machines having polyphase stator and rotor windings, means for driving one of said machines, said rotor windings being electrically interconnected to form a synchro-tie, a source of alternating current energy for energizing a portion of the stator windings of each of said respective machines, a source of direct current energy for supplying the remainder of said stator windings of the respective machines, switching means for completing a circuit between said direct current source and the remainder of said stator windings.

4. A synchro-tie unit comprising a pair of alternating current induction motors having polyphase stator and rotor windings, means operable to drive one of said motors, said rotor windings being electrically interconnected to form a synchro-tie, a source of alternating current energy for energizing all except one of the stator windings of each of said motors, a source of direct curent for supplying the remaining stator winding of each of said motors, switching means for selectively completing a circuit between said direct current source and each of said stator windings to be energized thereby.

5. A synchro-tie unit comprising a pair of alternating current induction motors having polyphase stator and rotor windings, means for driving one of said motors, said rotor windings being electrically interconnected to form a synchro-tie, a source of alternating current energy for energizing all except one of the stator windings of each of said motors, a source of direct current for supplying the remaining stator winding of each of said motors, switching means for completing a circuit between said direct current source and each of said stator windings to be energized thereby.

HERMANN HARZ.
VOLKMAR TÜRCK.